United States Patent [19]

Shimada et al.

[11] Patent Number: 5,284,896
[45] Date of Patent: Feb. 8, 1994

[54] RUBBER COMPOSITION

[75] Inventors: Jun Shimada, Hiratsuka; Shigeru Shinoda; Kazuhiro Yamada, both of Chigasaki, all of Japan

[73] Assignee: The Yokohama Rubber Co., Ltd., Tokyo, Japan

[21] Appl. No.: 15,046

[22] Filed: Feb. 8, 1993

Related U.S. Application Data

[63] Continuation of Ser. No. 694,332, May 1, 1991, abandoned.

[30] Foreign Application Priority Data

May 2, 1990 [JP]  Japan ................. 2-115254

[51] Int. Cl.$^5$ ............................................. C08K 3/10
[52] U.S. Cl. ..................................... 524/435; 524/477; 524/487; 524/575.5
[58] Field of Search ............ 524/435, 477, 487, 575.5

[56] References Cited

U.S. PATENT DOCUMENTS 3,856,731  12/1974  Shinomura ................... 524/487
3,897,583   7/1975  Bellamy ...................... 525/138

*Primary Examiner*—John C. Bleutge
*Assistant Examiner*—Mark Sweet
*Attorney, Agent, or Firm*—Finnegan, Henderson, Farabow, Garrett & Dunner

[57] ABSTRACT

Rubber compositions of a selected base rubber and a specified paraffin wax containing 50% or more of a normal paraffin and having a carbon area ratio of less than 4.0 as determined by gas chromatography within a carbon number range of from 23 to 42. The ratio is derived by counting a first paraffin content which is defined by the paraffin of maximum content in the wax and a second paraffin content which is defined by the paraffin of minimum content in the wax and thereafter dividing the first paraffin content by the second paraffin content. The composition is highly stable in initial tack with less dependence on temperature before curing.

7 Claims, 2 Drawing Sheets

RUBBER COMPOSITION

This application is a continuation of application Ser. No. 07/694,332, filed May 1, 1991, now abandoned.

BACKGROUND OF THE INVENTION

1. Field of the Invention

This invention relates to rubber compositions having improved stability in initial tack with reduced dependence on temperature prior to curing.

2. Description of the Prior Art

Various rubber compositions are known for use in applying or coating reinforcement cords of nonmetallic or metallic origin adapted to be assembled in pneumatic automobile tires and conveyor belts. These compositions before being subject to curing are rather dependent on temperature and necessarily variable or irregular in tackiness at ambient temperature. This tendency is markedly seen where organic cobalt compounds are blended to improve adhesion of rubbers to steel cords. In such instance objectionably excessive tack will develop with temperature rises in the hot season. With the reinforcing cords obtained by coating with the above prior compositions, the resulting rubbery sheets will become too tacky to be handled and cause those tires and belts to be produced at a low rate.

Attempts have been made to reduce tackiness with use of paraffin waxes chosen to meet seasonal changes or varying temperatures. To this end those waxes for use in the hot season have a maximum peak in the carbon area in the vicinity of 34 carbon atoms and those for use in the cold season at around 27 carbon atoms. Such carbon areas are determined with resort to a graphical chart in which the total carbon area of paraffin waxes within a predetermined number of carbon atoms is counted by means of gas chromatography and thereafter plotted against the carbon number. A distribution curve of carbon number to carbon area is thus drawn for quick reference from which either one paraffin wax is selected to provide a good balance between the tack quality and the ambient temperature.

The above mode of wax selectivity, however, is wholly unsatisfactory as the ultimate composition when held not constant at ambient temperature is encountered with insufficient tackiness and oftentimes with instable initial tack owing to irregular wax blooming. An impetus therefore has been given to the advent of rubber compositions free from the foregoing drawbacks of the prior art.

SUMMARY OF THE INVENTION

The present invention seeks to provide a new rubber composition which will exhibit high stability in initial tack with temperature dependence held to an absolute minimum in an uncured state.

Many other objectives and advantages of the invention will be better understood from the following description taken in conjunction with the accompanying drawings.

More specifically, the invention provides a rubber composition comprising 100 parts by weight of a base rubber and from 0.001 to 1.5 parts by weight of a paraffin wax containing 50 percent by weight or more of normal paraffin and having a carbon area ratio of not greater than 4.0 within a carbon number range of 23 to 42 on an analysis graph in which the content of each paraffin in the wax within said range of carbon numbers is plotted against its carbon number, the ratio resulting from gas chromatographically counting a first paraffin content which is defined by the paraffin of maximum content in the wax and a second paraffin content which is defined by the paraffin of minimum content in the wax and subsequently dividing the first paraffin content by the second paraffin content.

DETAILED DESCRIPTION OF THE INVENTION

The rubber composition according to the present invention is made up essentially of a selected base rubber and a specified paraffin wax.

Base rubbers useful for purposes of the invention are natural rubber (NR) and rubbers of a synthetic class. Typical examples of synthetic rubbers include diene rubbers such as polyisoprene rubber (IR), butadiene rubber (BR), styrene-butadiene rubber (SBR), butyl rubber (IIR) and the like and non-diene rubbers such as ethylene-propylene-diene rubber (EPDM) and the like. They may be used individually or in combination.

Suitable paraffins have an n-paraffin content of not less than 50% by weight, preferably above 75% by weight. Below 50% would retard wax blooming and hence lead to inadequate initial tack stability.

Figure 1:
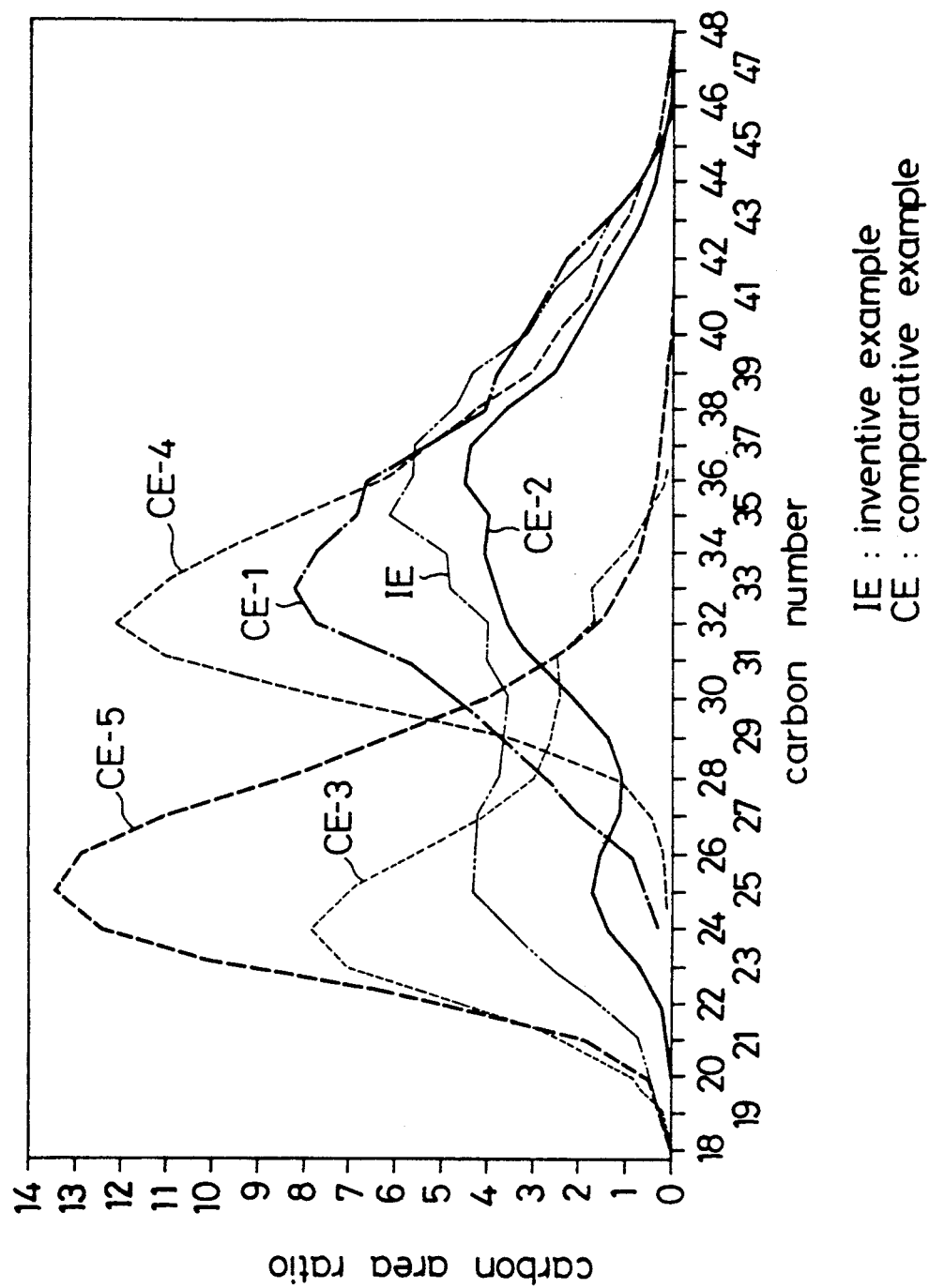
FIG. 1 is a graphic representation, of the paraffin wax according to the present invention, showing the content of each paraffin in the wax, calculated as the ratio of the amount of that paraffin to the total amount of all paraffins in the wax, plotted against its carbon number.

Importantly, paraffin waxes according to the invention should have a carbon area ratio of smaller than 4.0 within a carbon number of 23 to 42, preferably 25 to 40, on an analysis graph as shown in FIG. 1. This ratio used herein is determined, on gas chromatographic analysis, by counting a first or maximum paraffin content which is defined by the paraffin maximum content in the wax and a second or minimum paraffin content which is defined by the paraffin of minimum content in the wax and thereafter by dividing the maximum paraffin content by the minimum paraffin content. In FIG. 1 the paraffin wax contemplated under the invention is represented with a unique profile substantially trapezoidally distributed along the vertical axis or paraffin content and along the lateral axis or carbon number. To implement the invention, those waxes of 4.0 or smaller in carbon area ratio may suitably be chosen from the profile or curve shown in FIG. 1.

The amount of the above specified wax to be used may be set to be not more than 1.5 parts by weight, preferably below 1.0 part by weight, per 100 parts by weight of the base rubber. Above 1.5 parts would be feasible but also costly and responsible in some cases for physical deterioration.

The rubber composition of the invention is characteristically small in temperature dependence before curing, adequate in tackiness and stable in initial tack. To suit coating on to steel cords in particular, this composition may be further blended with a cobalt salt of an organic class such as cobalt naphthenate, cobalt rhodinate, cobalt stearate, cobalt neodecanate, cobalt octylate, cobalt propionate or the like. The cobalt compound may be added in an amount of for example 2 parts by weight per 100 parts by weight of the base rubber.

When it is found desirable, various other additives may be employed in conventional fashion. They include carbon blacks, fillers, sulfurs, vulcanizing accelerators, vulcanizing activators, antioxidants, softeners and the like.

The invention will now be described by way of the following examples which are provided for illustrative purposes only.

INVENTIVE EXAMPLE/COMPARATIVE EXAMPLES 1 TO 5

Six different rubber compositions were formulated in weight part and prepared as per tabulated with paraffin waxes varied.

In the table "Sunnoc" is a paraffin wax available commercially from Ohuchi Shinko Chemicals Co. and "Ozoace" from Nippon Seiro Co., and "Wax A to Wax D" are paraffin waxes prepared to facilitate comparison. "CA" stands for the carbon area ratio defined according to the invention. Used as an antioxidant was N-(1,3-dimethylbutyl)-N'-phenyl-p-phenylene diamine and as a vulcanizing accelerator N,N'-dicyclohexyl-2-benzothiazole sulfenamide.

Performance evaluation was made of all the test compositions under the conditions given below and with the results tabulated below.

Tackiness

The test composition was sheeted to a thickness of 1 mm, followed by press lamination onto a given backing cloth at 100° C. for 5 minutes. The laminate was severed to a strip of 5 mm in width and to a sheet of 50 mm × 50 mm in dimension, respectively. The strip was caused to wrap around a laminating ring on a tack tester after which the sheet was press-laminated at a speed of 500 mm/minute, at a load of 500 g and for a length of time of zero second or in an instantaneous manner. The tester was Picma Tack II of Toyo Seiki Co.

Peel strength in gram was checked which had been required for the sheet to be released from the strip after being allowed to stand at five different ambient temperatures of 0°, 10°, 20°, 30° and 40° C. and at a speed of 1,250 mm/minute. The smaller peel strength, the lower tackiness.

From the test results of peel strength the following properties were determined.

Peak Reduction Temperature

Determination was made as the temperature at which minimum peel strength was gained. This temperature is more or less broad, and the larger the breadth, the less dependent the tack is on temperature.

R Value

Defined by this value was the difference between the maximum and minimum levels of peel strength. The smaller numerical figure, the higher resistant the tack is to temperature dependence.

Half-Value Time

Peel strength was examined with lengths of time of standing varied at one and the same temperature. This half-value time was taken to refer to the passage of time required for peel strength to reach a half level with that measured without standing. The smaller numerical figure, the more stable the initial tack is.

As is evident from the tabulated data, the composition according to the invention is broad at from 30° to 40° C. in peak reduction temperature and small in R value. This means that the inventive composition excels in initial tack stability with the least temperature dependence.

More normal paraffin was effective to reduce R value or otherwise improve initial tack stability as in Comparative Example 4, while less of such component showed a sharp decline in that stability, as appears clear from Comparative Example 2.

Too high level of CA in Comparative Examples 3 and 5 revealed too large value of R, namely unacceptable proofness to temperature dependence.

Figure 2:
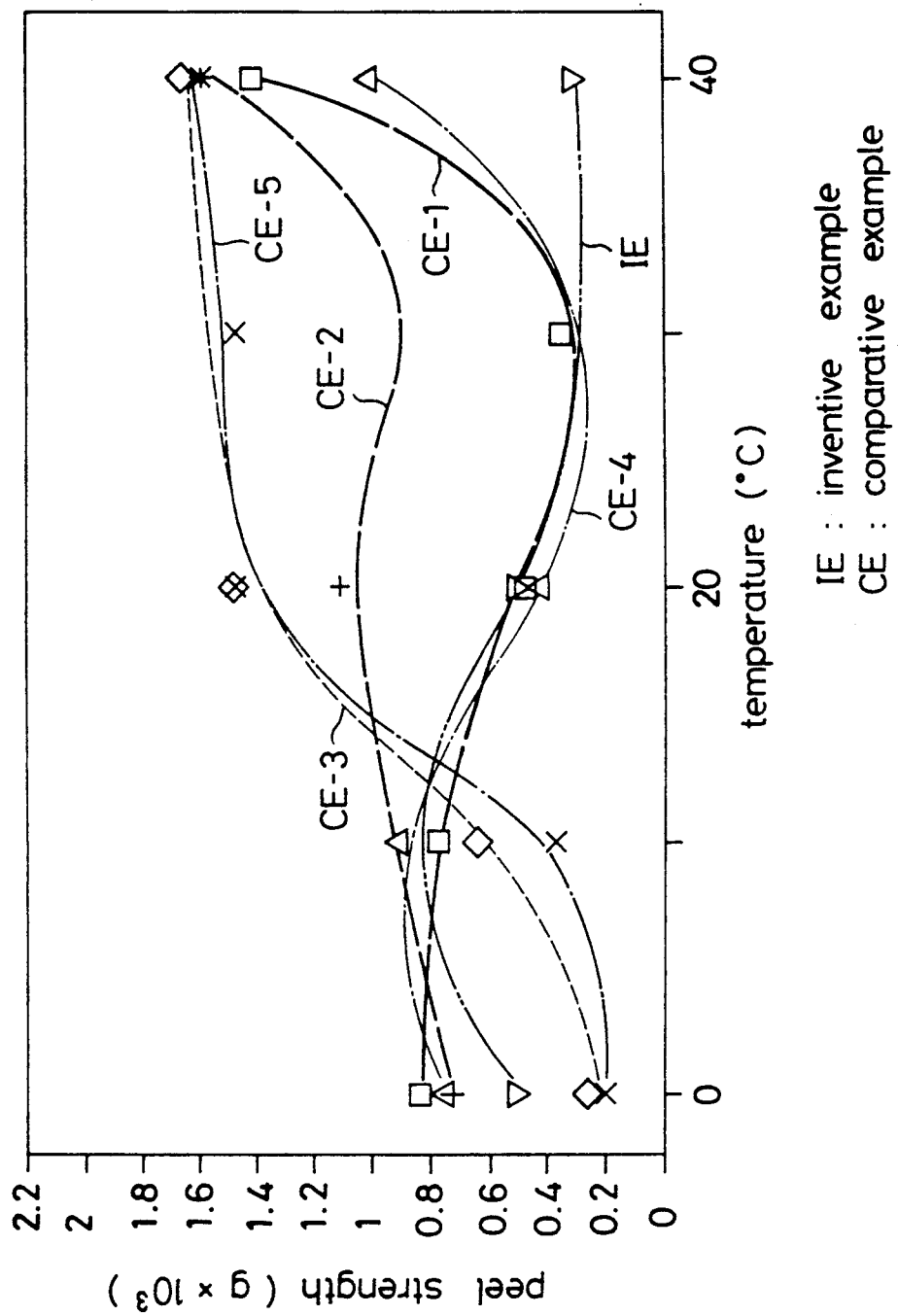
FIG. 2 is a graph showing the rubber composition of the invention in which the peel strength is plotted against the ambient temperature.

As seen in FIG. 2, the inventive composition has been proved to be fairly moderately curved in the plots of peel strength against varying ambient temperatures as compared to the control compositions. This unique behavior thus plays a great in achieving the beneficial effects of the invention.

TABLE

| Runs | Comparative Example | | | | | Inventive Example |
|---|---|---|---|---|---|---|
| | 1 | 2 | 3 | 4 | 5 | |
| formulation | | | | | | |
| NR | 100 | 100 | 100 | 100 | 100 | 100 |
| carbon black | 60 | 60 | 60 | 60 | 60 | 60 |
| zinc oxide | 6 | 6 | 6 | 6 | 6 | 6 |
| sulfur | 7.5 | 7.5 | 7.5 | 7.5 | 7.5 | 7.5 |
| antioxidant | 2 | 2 | 2 | 2 | 2 | 2 |
| accelerator | 0.5 | 0.5 | 0.5 | 0.5 | 0.5 | 0.5 |
| colablt naphthenate | 2 | 2 | 2 | 2 | 2 | 2 |
| paraffin wax | 0.4 | 0.4 | 0.4 | 0.4 | 0.4 | 0.4 |
| paraffin wax | | | | | | |
| type | Sunnoc | Wax A | Wax B | Wax C | Wax D | Ozoace |
| CA | 16.0 | 4.3 | 696 | 120.7 | 223.5 | 2.0 |
| n-paraffin (%) | 57.8 | 49.7 | 54.6 | 91.0 | 92.2 | 75.2 |
| peak reduction temp (°C.) | 30 | 0, 30 | 0 | 30 | 0 | 0, 30–40 |
| half-value time (hr-min) | 1 hr 30 min | 8 hr | 1 hr 10 min | 43 min | 1 hr 20 min | 1 hr 30 min |
| R value | 1093 | 863 | 1434 | 710 | 1377 | 563 |

What is claimed is:

1. A rubber composition comprising 100 parts by weight of natural rubber and from 0.001 to 1.5 parts by weight of a paraffin wax containing 50 percent by weight or more of a normal paraffin and having a carbon area ratio of not greater than 4.0 within a carbon number range of from 23 to 42 on an analysis graph in which the content of each paraffin in the wax within said range of carbon members is plotted against its carbon number, said ratio resulting from gas chromatographically counting a first paraffin content which is defined by the paraffin of maximum content in the wax and a second paraffin content which is defined by the paraffin of minimum content in the wax and subsequently dividing said first paraffin content by said second paraffin content.

2. The rubber composition of claim 1, including an organic cobalt compound.

3. The rubber composition of claim 2, wherein said cobalt compound range is selected from the group consisting of cobalt naphthenate, cobalt rhodinate, cobalt stearate, cobalt neodecanate, cobalt octylate and cobalt propionate.

4. The rubber composition of claim 1, wherein the carbon number range is from 25 to 40.

5. The rubber composition of claim 1, wherein the paraffin wax is from 0.001 to 1.0 parts by weight per 100 parts of the base rubber.

6. The rubber composition of claim 1, wherein the paraffin wax contains 75 percent by weight or more of normal paraffin.

7. The rubber composition comprising 100 parts by weight of natural rubber and from 0.001 to 1.0 parts by weight of a paraffin wax containing 75 percent by weight or more of normal paraffin and having a carbon area ratio of not greater than 4.0 within a carbon number range of from 25 to 40 on an analysis graph in which the content of each paraffin in the wax within said range of carbon numbers is plotted against its carbon number, said ratio resulting from gas chromatographically counting a first paraffin content which is defined by the paraffin of maximum content in the wax and a second paraffin content which is defined by the paraffin of minimum content in the wax and subsequently dividing said first paraffin content by said second paraffin content.

* * * * *

UNITED STATES PATENT AND TRADEMARK OFFICE
CERTIFICATE OF CORRECTION

PATENT NO. : 5,284,896
DATED : February 8, 1994
INVENTOR(S) : Jun Shimada et al.

It is certified that error appears in the above-indentified patent and that said Letters Patent is hereby corrected as shown below:

On the title page, item [57], Abstract, line 2, "was" should read --wax--.

Column 6, line 3, delete "base".

Signed and Sealed this

Fourth Day of October, 1994

Attest:

BRUCE LEHMAN

Attesting Officer    Commissioner of Patents and Trademarks